(12) United States Patent
Senshiki (10) Patent No.: US 12,526,507 B2
(45) Date of Patent: Jan. 13, 2026

(54) PARAMETER DETERMINATION METHOD, INFORMATION PROCESSING DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Hiroki Senshiki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 279 days.

(21) Appl. No.: 18/383,245

(22) Filed: Oct. 24, 2023

(65) Prior Publication Data

US 2024/0137640 A1 Apr. 25, 2024
US 2024/0236471 A9 Jul. 11, 2024

(30) Foreign Application Priority Data

Oct. 25, 2022 (JP) ................. 2022-170407

(51) Int. Cl.
| | |
|---|---|
| *H04N 23/61* | (2023.01) |
| *H04N 5/74* | (2006.01) |
| *H04N 23/90* | (2023.01) |
| *H04N 1/04* | (2006.01) |

(52) U.S. Cl.
CPC ............... *H04N 23/61* (2023.01); *H04N 5/74* (2013.01); *H04N 23/90* (2023.01); *H04N 1/04* (2013.01)

(58) Field of Classification Search
USPC ........................................................ 382/103
See application file for complete search history.

(56) References Cited

U.S. PATENT DOCUMENTS

| | | | |
|---|---|---|---|
| 10,922,559 B2 * | 2/2021 | Kuehnle | G06V 20/58 |
| 12,315,199 B2 * | 5/2025 | Hellweg | G06T 7/80 |
| 2006/0209268 A1 | 9/2006 | Raskar et al. | |
| 2013/0063589 A1 | 3/2013 | Jiang et al. | |

FOREIGN PATENT DOCUMENTS

| | | |
|---|---|---|
| JP | 2008-533501 A | 8/2008 |
| JP | 2014-526736 A | 10/2014 |

OTHER PUBLICATIONS

"Camera Calibration and 3D Reconstruction". OpenCV, Sep. 8, 2022.
"Relative Camera Pose". MATLAB, The MathWorks, Inc.
"Estimate Essential Matrix". MATLAB, The MathWorks, Inc.

* cited by examiner

*Primary Examiner* — Darryl V Dottin
(74) *Attorney, Agent, or Firm* — Oliff PLC (57) ABSTRACT

A parameter determination method includes: determining N, N being a natural number greater than 1, first regions included in at least a part of a first image acquired by capturing a target with a first optical device positioned at a first position and whose internal parameters are known, or the first image projected from the first optical device; determining N second regions corresponding to the respective N first regions in a one-to-one manner in a second image acquired by capturing the target with a second optical device positioned at a second position different from the first and whose internal parameters are known; determining N homographies between the N first regions and the N second regions in a one-to-one manner; and determining at least one of a first parameter related to the second optical device and a second parameter related to the capturing target by decomposing each of the N homographies.

8 Claims, 6 Drawing Sheets

PARAMETER DETERMINATION METHOD, INFORMATION PROCESSING DEVICE, AND NON-TRANSITORY COMPUTER-READABLE STORAGE MEDIUM STORING PROGRAM

The present application is based on, and claims priority from JP Application Serial Number 2022-170407, filed Oct. 25, 2022, the disclosure of which is hereby incorporated by reference herein in its entirety.

BACKGROUND

1. Technical Field

The present disclosure relates to a parameter determination method, an information processing device, and a non-transitory computer-readable storage medium storing a program.

2. Related Art

A technique of identifying a parameter related to a camera based on an image obtained by capturing an object with the camera is known.

For example, JP-T-2014-526736 discloses a technique of acquiring two images of a plane object from different positions using a camera, decomposing a homography between the two images to obtain at least one possible solution, and deriving a parameter related to rotation of the camera based on the possible solution.

A homography decomposition method is based on the premise that an object is planar. Therefore, when the object includes at least a part of a non-planar surface, a parameter related to an optical device such as a camera cannot be determined by the technique in JP-T-2014-526736.

SUMMARY

A parameter determination method according to one aspect of the present disclosure includes: determining N, N being a natural number greater than 1, first regions included in at least a part of a first image acquired by capturing an capturing target with a first optical device which is positioned at a first position and whose internal parameters are known, or the first image projected from the first optical device; determining N second regions corresponding to the respective N first regions in a one-to-one manner in a second image acquired by capturing the capturing target with a second optical device which is positioned at a second position different from the first position and whose internal parameters are known; determining N homographies by determining homographies between the N first regions and the N second regions in a one-to-one manner; and determining at least one of a first parameter related to the second optical device and a second parameter related to the capturing target by decomposing each of the N homographies.

An information processing device according to one aspect of the present disclosure includes: at least one processor configured to perform processing including: determining N, N being a natural number greater than 1, first regions included in at least a part of a first image acquired by capturing an capturing target with a first optical device which is positioned at a first position and whose internal parameters are known, or the first image projected from the first optical device; determining N second regions corresponding to the respective N first regions in a one-to-one manner in a second image acquired by capturing the capturing target with a second optical device which is positioned at a second position different from the first position and whose internal parameters are known; determining N homographies by determining homographies between the N first regions and the N second regions in a one-to-one manner; and determining at least one of a first parameter related to the second optical device and a second parameter related to the capturing target by decomposing each of the N homographies.

A non-transitory computer-readable storage medium storing a program according to one aspect of the present disclosure causes a computer to execute processing including: determining N, N being a natural number greater than 1, first regions included in at least a part of a first image acquired by capturing an capturing target with a first optical device which is positioned at a first position and whose internal parameters are known, or the first image projected from the first optical device; determining N second regions corresponding to the respective N first regions in a one-to-one manner in a second image acquired by capturing the capturing target with a second optical device which is positioned at a second position different from the first position and whose internal parameters are known; determining N homographies by determining homographies between the N first regions and the N second regions in a one-to-one manner; and determining at least one of a first parameter related to the second optical device and a second parameter related to the capturing target by decomposing each of the N homographies.

DESCRIPTION OF EMBODIMENTS

Hereinafter, preferred embodiments according to the present disclosure will be described with reference to the drawings. In the drawings, dimensions and scales of respective portions may be appropriately different from those of actual portions, and portions schematically shown for easy understanding may be included. In the following description, a scope of the present disclosure is not limited to aspects described in the following description unless there is a specific description to the effect that the present disclosure is limited. In addition, the scope of the present disclosure includes a scope equivalent to the aspects.

1. First Embodiment

Figure 1:
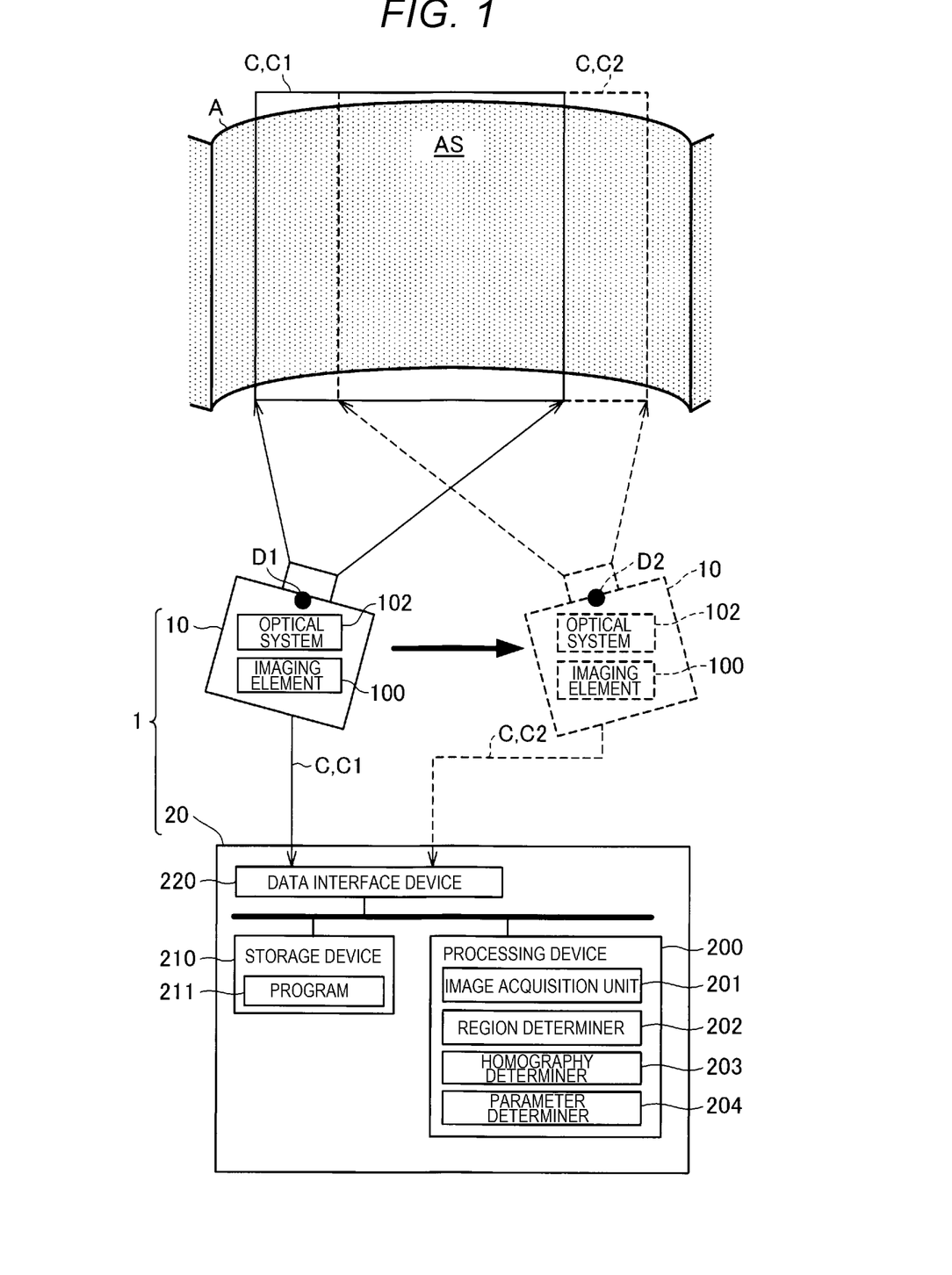
FIG. 1 is a schematic diagram showing an example of a parameter determination system according to an embodiment of the present disclosure.
Figure 2:
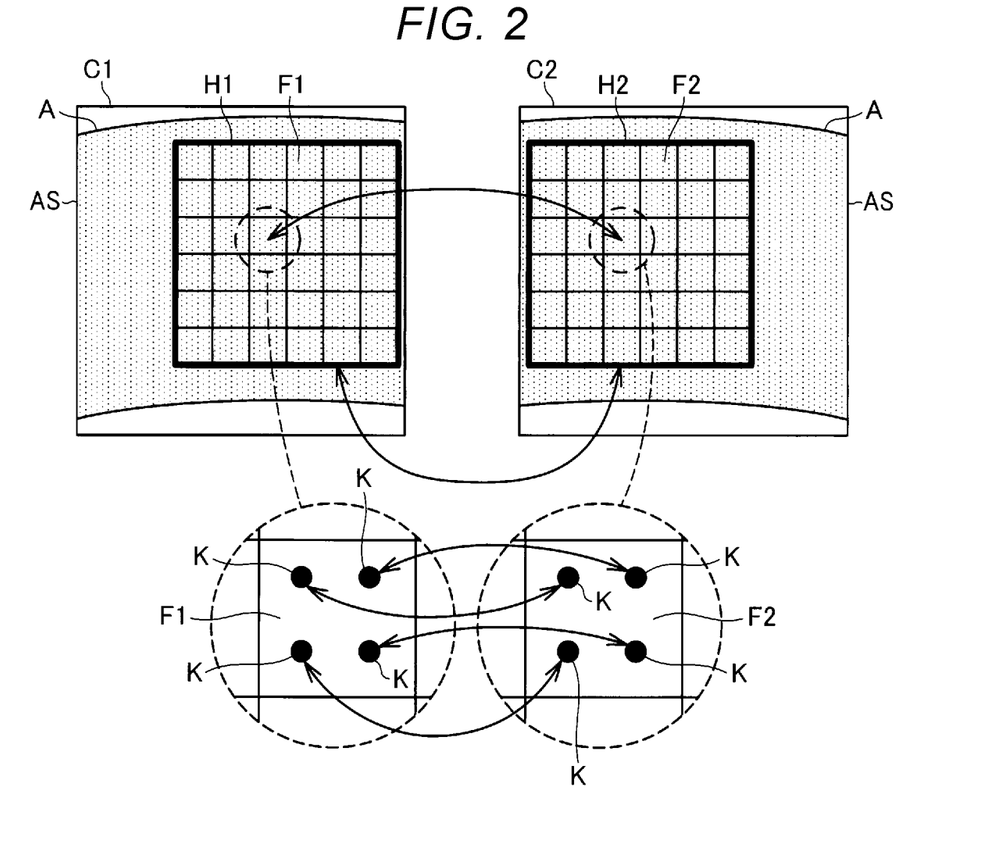
FIG. 2 is a diagram illustrating a first range, a second range, N first regions, and N second regions.

FIG. 1 is a schematic diagram showing an example of a parameter determination system 1. FIG. 2 is a diagram illustrating a first range H1, a second range H2, N first regions F1, and N second regions F2.

The parameter determination system 1 includes an optical device 10 that captures an object A which is an capturing target and an information processing device 20, and is a system in which the information processing device 20 determines at least one of a first parameter B1 related to the optical device 10 and a second parameter B2 related to the object A.

The optical device 10 is a device including an imaging element 100 for acquiring an image C by capturing the object A, and an optical system 102 for forming an image of the object A, and is an capturing device in the embodiment. The optical system 102 includes, for example, optical members such as one or a plurality of lenses and one or a plurality of diaphragms. The optical device 10 according to the embodiment is a device whose internal parameters are known. The internal parameters are parameters related to characteristics of the optical system 102, for example, parameters representing a focal length and an optical center. The internal parameters are generally also referred to as a camera matrix, and correspond to a matrix for transforming a coordinate system of the optical device 10 into coordinates of the image C.

The optical device 10 according to the embodiment moves between two different points, that is, a first position D1 and a second position D2, captures the object A at the first position D1 to acquire a first image C1, and captures the object A at the second position D2 to acquire a second image C2.

In the present disclosure, the optical device 10 positioned at the first position D1 corresponds to a first optical device, and the optical device 10 positioned at the second position D2 corresponds to a second optical device. The optical device 10 may be moved by being carried by a user, or may be moved by a conveying mechanism that conveys the optical device 10, or a self-traveling mechanism causing the optical deice 10 to self-travel. In the following description, it is assumed that the optical device 10 moves from the first position D1 to the second position D2 in this order.

The object A is a tangible object to be captured by the optical device 10. The object A is not limited to being tangible.

The information processing device 20 is, for example, a stationary or portable computer.

The information processing device 20 according to the embodiment determines the first parameter B1 and the second parameter B2 based on a homography H based on the first image C1 and the second image C2. In addition, even when a surface AS of the object A is a non-planar surface or the surface AS includes a non-planar surface portion, the information processing device 20 can determine the first parameter B1 and the second parameter B2 based on N homographies H to be described later.

In the present disclosure, the term "non-planar surface" means that the surface is not a plane. Specifically, the non-planar surface means a surface having one or a plurality of finite curvatures. In the non-planar surface, connection points of several regions having mutually different curvatures may have the curvatures that change continuously or may have the curvatures that change discontinuously.

In addition, in the present disclosure, even when the surface AS is a single plane, the information processing device 20 can determine the first parameter B1 and the second parameter B2 based on the N homographies H to be described later.

As shown in FIG. 1, the information processing device 20 includes a processing device 200, a storage device 210, and a data interface device 220, which are coupled to a bus.

The processing device 200 includes one or a plurality of processors such as a central processing unit (CPU). A part of functions of the processing device 200 may be implemented by a circuit such as a field programmable gate array (FPGA). The storage device 210 is a storage medium readable by the processing device 200. The storage device 210 includes, for example, a nonvolatile memory and a volatile memory. The nonvolatile memory is, for example, a read only memory (ROM), an erasable programmable read only memory (EPROM), or an electrically erasable programmable read only memory (EEPROM). The volatile memory is, for example, a random access memory (RAM). The data interface device 220 is a device which receives data of the image C from the optical device 10. The data interface device 220 includes hardware conforming to a specific standard related to data input, and the hardware includes, for example, a connector and an interface circuit.

The storage device 210 according to the embodiment stores a program 211 for controlling the information processing device 20. When the processor of the processing device 200 executes the program 211, the processing device 200 functions as an image acquisition unit 201, a region determiner 202, a homography determiner 203, and a parameter determiner 204.

The image acquisition unit 201 acquires the image C from the optical device 10 via the data interface device 220. The image C obtained by the image acquisition unit 201 includes at least two images including the first image C1 and the second image C2.

When N is a natural number greater than 1, the region determiner 202 determines N first regions F1 included in at least a part of the first image C1. The region determiner 202 determines, in the second image C2, a second region F2 corresponding to the first region F1 for each of the N first regions F1.

More specifically, as shown in FIG. 2, the region determiner 202 in the embodiment determines a first range H1 in the first image C1, and divides the first range H1 into N regions to determine the N first regions F1. Similarly, for the second region F2, the region determiner 202 determines a second range H2 in the second image C2, and divides the second range H2 into N regions to determine the N second regions F2.

The first range H1 is at least a part of a region in which the object A appears in the first image C1. The second range H2 is a range in the second image C2 corresponding to the first range H1 of the first image C1, that is, a range in which the same object A or the same part of the object A as the first range H1 appears. Therefore, each of the N first regions F1 in the first range H1 corresponds to, in a one-to-one manner, the second region F2, in which the same object A or the same portion of the object A appears, among the N second regions F2 in the second range H2.

Further, both the first region F1 and the second region F2 are regions having the same area, and are set to have an area larger than pixels determined by a degree of resolution of the image C. The number N of the first regions F1 and the number N of the second regions F2 are preferably as large as possible. Even when the surface AS of the object A that appears in the first range H1 and the second range H2 includes at least a part of the non-planar surface, the first range H1 and the second range H2 are respectively divided into the N first regions F1 and the N second regions F2, and thus the surface AS of the object A is handled as a set of the N first regions F1 and the N second regions F2 that are regarded as minute planes.

The homography determiner 203 determines the homography H between one of the N first regions F1 in the first image C1 and a corresponding one of the N second regions F2 in the second image C2 to determine N homographies H.

Each of the N homographies H is a projective transformation matrix for projective transformation of a coordinate system of the first region F1 into a coordinate system of the corresponding second region F2. As shown in FIG. 2, the homography determiner 203 in the embodiment sets four or more corresponding points K corresponding to each other in each of the first region F1 and the second region F2 that correspond to each other in a one-to-one manner, and determines, for the corresponding points K, the homographies H by a known method by analytically obtaining a linear correspondence relationship between the coordinates of the corresponding points K in the coordinate system of the first region F1 and the coordinates of the corresponding points K in the coordinate system of the second region F2. Then, the homography determiner 203 determines the N homographies H by determining the homographies H for the N pairs of the first region F1 and the second region F2.

The coordinate systems of the first region F1 and the second region F2 used to determine the homography H are determined by, for example, the region determiner 202 or the homography determiner 203 based on the known internal parameters of the optical device 10. In this case, each of the coordinate systems of the first region F1 and the second region F2 may be a coordinate system in which lens distortion of the optical system 102 is compensated. The compensation for the lens distortion is performed using parameters such as a lens distortion coefficient.

The parameter determiner 204 determines the first parameter B1 and the second parameter B2 based on the N homographies H determined by the homography determiner 203. The parameter determiner 204 may determine anyone of the first parameter B1 and the second parameter B2 instead of determining both.

The first parameter B1 in the embodiment is a parameter including a relative positional relationship of the optical device 10 positioned at the second position D2 with respect to the optical device 10 positioned at the first position D1.

Specifically, the first parameter B1 is an external parameter of the optical device 10 positioned at the second position D2, and includes a parameter related to a position and a posture. The parameter related to the position includes coordinates of a relative position of the second position D2 with respect to the first position D1, and is determined based on a translation vector t to be described later. The parameter related to the posture includes a rotation amount of the optical device 10 positioned at the second position D2 with respect to the optical device 10 positioned at the first position D1, and is determined based on a rotation matrix R to be described later.

The second parameter B2 in the embodiment includes a parameter related to a shape of the surface AS of the object A which is the capturing target, and specifically includes N normal vectors n. The N normal vectors n are vectors indicating respective normal directions of the N first regions F1.

In the following description, the coordinate system of the optical device 10 positioned at the first position D1 is referred to as a "first coordinate system Pd1", and the coordinate system of the optical device 10 positioned at the second position D2 is referred to as a "second coordinate system Pd2". In the embodiment, it is assumed that the first coordinate system Pd1 is a world coordinate system Pw. The first coordinate system Pd1, the second coordinate system Pd2, and the world coordinate system Pw are all orthogonal three-dimensional coordinate systems.

Figure 3:
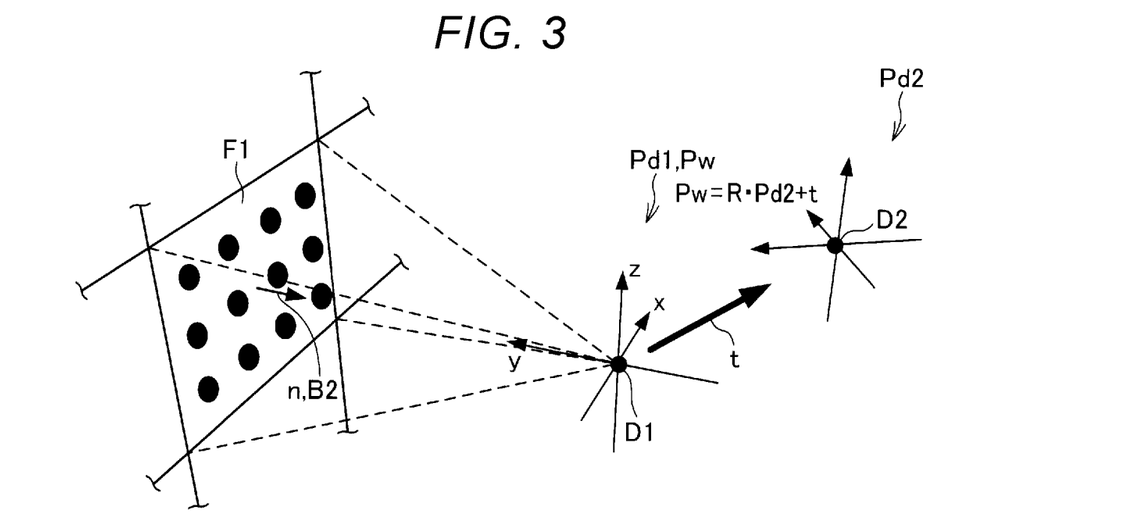
FIG. 3 is a diagram illustrating a translation vector, a rotation matrix, and a normal vector.

FIG. 3 is a diagram illustrating the translation vector t, the rotation matrix R, and the normal vector n.

The translation vector t is a vector indicating a movement of the optical device 10 from the first position D1 to the second position D2. The rotation matrix R is a matrix indicating rotation of the optical device 10 positioned at the second position D2 with respect to the optical device 10 positioned at the first position D1. As shown in FIG. 3, a relationship between the second coordinate system Pd2 and the world coordinate system Pw is expressed by Pw=R·Pd2+t. Therefore, by obtaining the translation vector t and the rotation matrix R, position coordinates and a rotation amount of the optical device 10 positioned at the second position D2 in the world coordinate system Pw are obtained.

The normal vector n is a normal vector of the first region F1 in the first coordinate system Pd1, that is, the world coordinate system Pw. Due to each of the normal vectors n of the N first regions F1, it is possible to determine a curvature, unevenness, and the like of a portion of the first range H1 in the surface AS of the object A.

Here, the translation vector t, the rotation matrix R, and the normal vector n are determined by decomposing one homography H. For decomposition of the homography H, singular value decomposition (SVD) is generally used. It is generally known that a plurality of solutions are obtained by the decomposition of the homography H. In the embodiment, the translation vector t, the rotation matrix R, and the normal vector n are determined one by one for each homography H under conditions that the object A is positioned in front, which is an capturing direction of the optical device 10, a relative positional relationship between the first position D1 and the second position D2, and the like.

In the embodiment, since the N homographies H are determined, N translation vectors t, N rotation matrices R, and N normal vectors n are determined by respectively decomposing the N homographies H. A set of the translation vector t and the rotation matrix R based on one homography H is obtained for the coordinate system of one first region F1 corresponding to the homography H.

Therefore, the parameter determiner 204 statistically processes the N parameters related to the position and the N parameters related to the posture, respectively, thereby determining one parameter related to the position and one parameter related to the posture in the world coordinate system Pw. A set of one parameter related to the position and one parameter related to the posture corresponds to one first parameter B1 in the present disclosure.

In the embodiment, a trimmed mean is used for statistical processing of the N parameters related to the position and the N parameters related to the posture. The trimmed mean is an average value of parameters obtained by excluding parameters in the vicinity of a minimum value and parameters in the vicinity of a maximum value among the N parameters. From each of the minimum value and the maximum value of the N parameters to a median in order, the parameters corresponding to X % of the N parameters are excluded. X is a natural number greater than "0", such as "10". By using the trimmed mean for the statistical processing, it is possible to obtain the average value from the N parameters without being affected by an outlier and an abnormal value included in the N parameters. The outlier refers to a value having an abnormally large residual difference from an estimated value of a true value among the obtained parameters. The abnormal value refers to a value of a parameter whose cause of abnormality is known among the obtained parameters.

Figure 4:
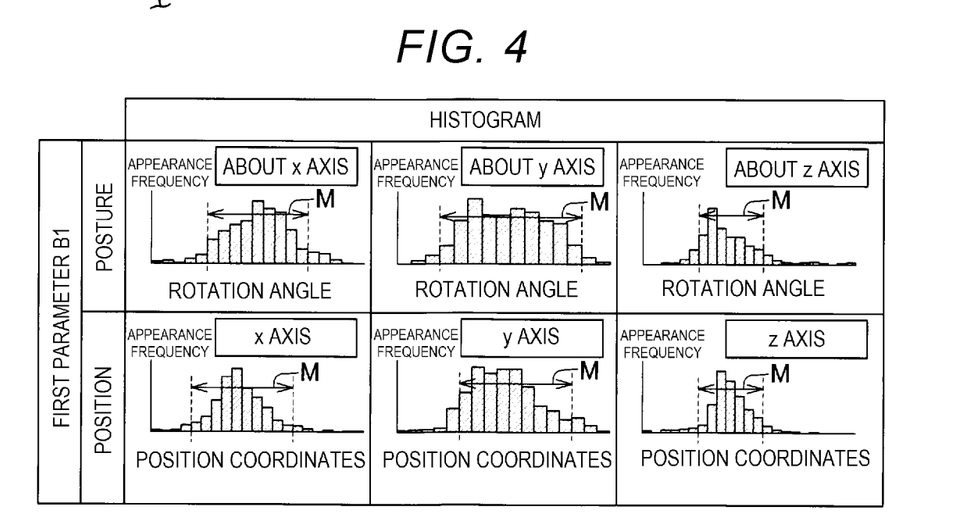
FIG. 4 is a diagram showing examples of histograms obtained from N parameters related to a position and N parameters related to a posture.

FIG. 4 is a diagram showing examples of histograms obtained from the N parameters related to the position and the N parameters related to the posture.

As shown in FIG. 4, the parameter related to the position includes position coordinates of each axis of the world coordinate system Pw. Then, in the histogram of the position coordinates of each axis, an average value of the parameters in a remaining range M excluding the parameters in the vicinity of the minimum value and in the vicinity of the maximum value is a trimmed mean.

The parameter related to the posture includes a rotation angle about each axis of the world coordinate system Pw. Then, in the histogram of the rotation angle about each axis, an average value of the parameters in a remaining range M excluding the parameters in the vicinity of the minimum value and in the vicinity of the maximum value is a trimmed mean.

Figure 5:
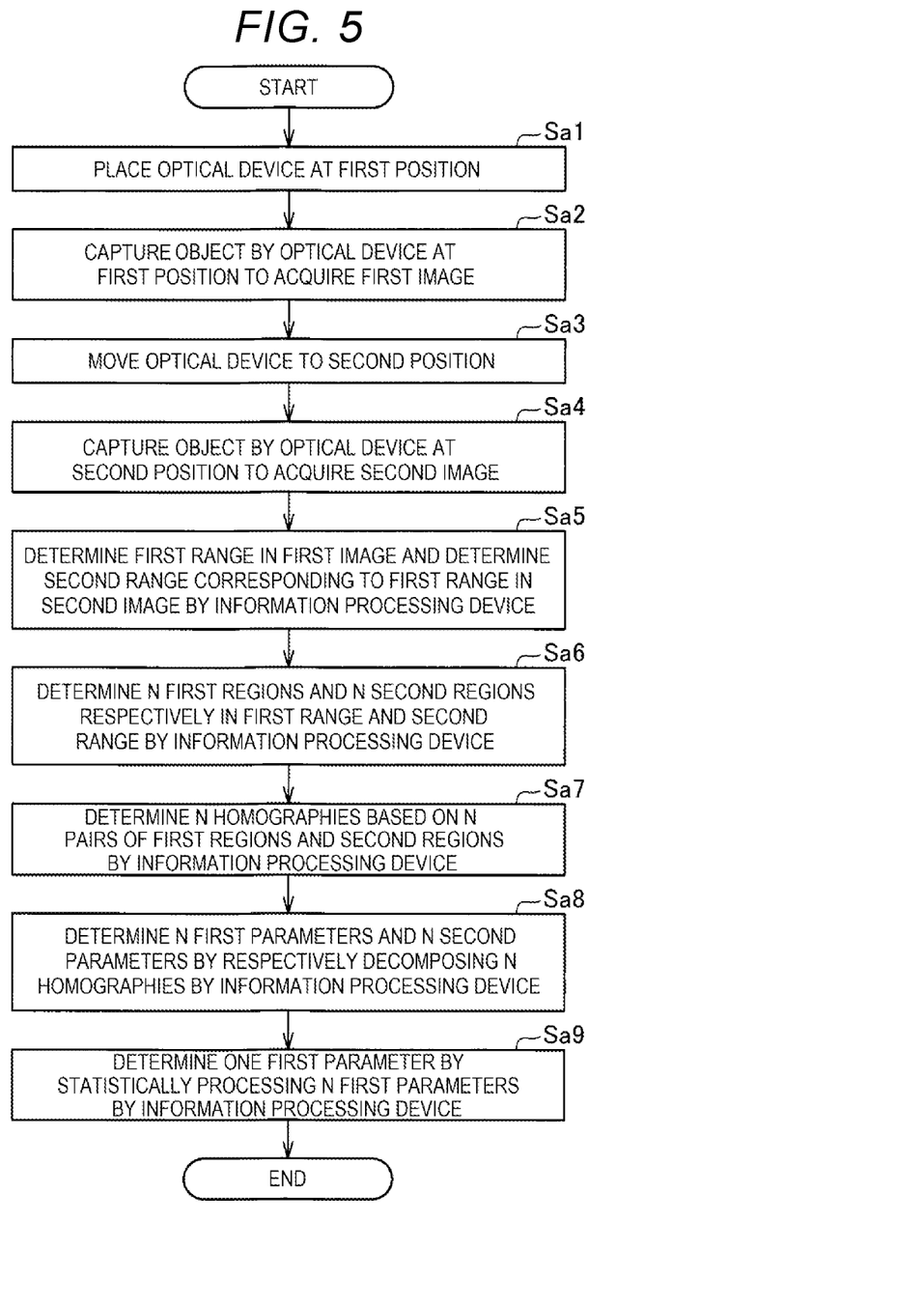
FIG. 5 is a diagram showing an example of an operation of the parameter determination system.

FIG. 5 is a diagram showing an example of an operation of the parameter determination system 1.

First, a user or the like places the optical device 10 at the first position D1 (step Sa1). Then, at the first position D1, the optical device 10 captures the object A to acquire the first image C1 (step Sa2). Next, the user or the like moves the optical device 10 to the second position D2 (step Sa3). Then, at the second position D2, the optical device 10 captures the object A to acquire the second image C2 (step Sa4). The first image C1 and the second image C2 are acquired by the image acquisition unit 201 of the information processing device 20 at an appropriate timing.

Next, in the information processing device 20, the region determiner 202 determines the first range H1 in the first image C1 and determines the second range H2 corresponding to the first range H1 in the second image C2 (step Sa5). Then, the region determiner 202 divides each of the first range H1 and the second range H2 into N regions to determine the N first regions F1 in the first image C1, and determine the N second regions F2, which correspond to the first regions F1 in a one-to-one manner, in the second image C2 (step Sa6).

Next, in the information processing device 20, the homography determiner 203 determines the homography H between one of the N first regions F1 and a corresponding one of the N second regions F2, in other words, determining the respective homographies H for the N pairs of the N first regions F1 and the N second regions F2, to thus determine N homographies (step Sa7).

Next, in the information processing device 20, the parameter determiner 204 determines the N first parameters B1 related to the optical device 10 and the N second parameters B2 related to the object A by decomposing the respective N homographies H (step Sa8).

As described above, the N first parameters B1 include the parameters related to the position and the posture of the optical device 10 at the second position D2 with respect to the optical device 10 at the first position D1. The parameter related to the position includes the position coordinates in the coordinate system of the first region F1, and the parameter related to the posture includes the rotation angle in the coordinate system of the first region F1. The second parameter B2 includes the parameter related to the shape of the surface AS of the object A, and specifically, includes respective normal vectors n of the N first regions F1.

Then, the parameter determiner 204 determines one first parameter B1 by statistically processing the N first parameters B1 (step Sa9).

In the embodiment, as described above, the trimmed mean is used for the statistical processing. The N first parameters B1 include the N parameters related to the position and the N parameters related to the posture. One parameter related to the position is determined by the trimmed mean of the N parameters related to the position, and one parameter related to the posture is determined by the trimmed mean of the N parameters related to the posture.

The statistical processing is not limited to the trimmed mean. The statistical processing may be processing of obtaining another average value such as an arithmetic average.

In the processing shown in FIG. 5, the information processing device 20 may obtain one of the one first parameter B1 and the N second parameters B2 instead of obtaining both the one first parameter B1 and the N second parameters B2.

As described above, the information processing device 20 in the embodiment executes the following series of processing. That is, the processing includes determining the N (N is a natural number greater than 1) first regions F1 included in at least a part of the first image C1 acquired by capturing the object A by the optical device 10 which is positioned at the first position D1 and whose internal parameters are known; determining the second region F2, which corresponds to the first region F1, for each of the N first regions F1 in the second image C2 acquired by capturing the object A by the optical device 10 which is positioned at the second position D2; determining the N homographies H by determining the homographies H between the N first regions F1 and the N second regions F2; and determining at least one of the first parameter B1 related to the optical device 10 positioned at the second position D2 and the second parameter B2 related to the object A by decomposing each of the N homographies H.

According to the processing, even when the surface AS of the object A that appears in the first image C1 and the second image C2 includes a non-planar surface, the first parameter B1 related to the optical device 10 can be determined. In addition, the second parameter B2 related to the object A can also be determined.

In the above-described processing in the embodiment, the determining at least one of the first parameter B1 related to the optical device 10 which is positioned at the second position D2 and the second parameter B2 related to the object A includes determining the N first parameters B1 by decomposing the respective N homographies H and determining one first parameters B1 by statistically processing the N first parameters B1.

According to the processing, one first parameter B1 is accurately determined by statistically processing the N first parameters B1.

In the above-described processing in the embodiment, the determining at least one of the first parameter B1 related to the optical device 10 which is positioned at the second position D2 and the second parameter B2 related to the object A includes determining the N second parameters B2 for the N first regions F1 by decomposing the respective N homographies H.

According to the processing, the second parameter B2 can be obtained for each of the N first regions F1 in the first range H1. By using the N second parameters B2, the shape of the object A that appears in the first range H1 can be identified.

In the embodiment, the surface AS of the object A includes at least a part of a non-planar surface.

According to the embodiment, even when the non-planar surface is actually included in the surface AS of the object A, the first parameter B1 and the second parameter B2 can be reliably determined based on the N homographies H.

In the embodiment, the optical device 10 is an capturing device including the optical system 102 configured to image the first image C1 and the second image C2.

According to the embodiment, the first parameter B1 of the optical device 10 when positioned at the second position D2 can be determined by one optical device 10.

2. Second Embodiment

Figure 6:
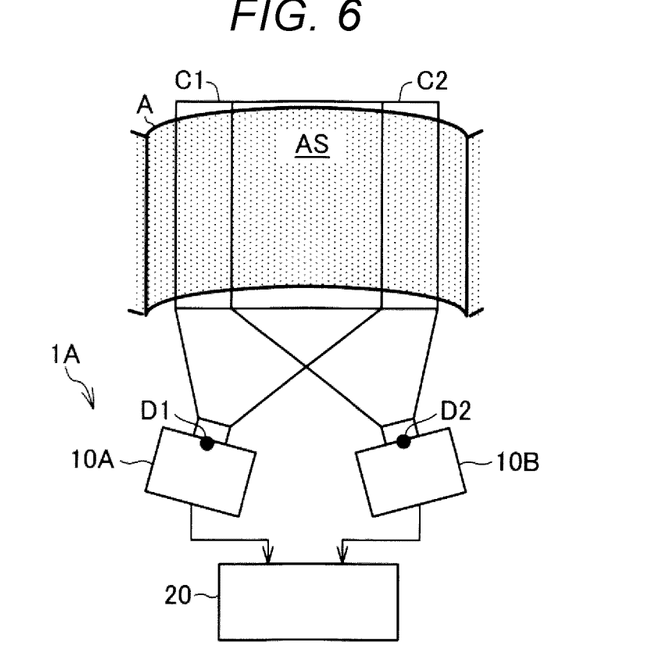
FIG. 6 is a schematic diagram showing an example of a parameter measurement system according to a second embodiment.

FIG. 6 is a schematic diagram showing an example of a parameter determination system 1A according to the embodiment. In FIG. 6, elements common to those of the first embodiment are denoted by the same reference numerals, and a detailed description thereof is omitted.

In the first embodiment, the parameter determination system 1 includes one optical device 10. As shown in FIG. 6, the parameter determination system 1A according to the embodiment includes two optical devices 10, that is, a first optical device 10A and a second optical device 10B.

The first optical device 10A is a device whose internal parameters are known and which acquires the first image C1 by capturing the object A at the first position D1. The second optical device 10B is a device different from the first optical device 10A, and is a device whose internal parameters are known and which acquires the second image C2 by capturing the object A at the second position D2. The first optical device 10A and the second optical device 10B may be a single stereo camera whose internal parameters are known.

The configuration of the information processing device 20 is the same as that of the first embodiment. That is, in the information processing device 20, the image acquisition unit 201 acquires the first image C1 acquired by the first optical device 10A and the second image C2 acquired by the second optical device 10B. Then, the information processing device 20 determines at least one of the one first parameter B1 and the N second parameters B2 by executing step Sa5 to step Sa9 in FIG. 5.

According to the embodiment, at least one of the first parameter B1 related to the second optical device 10B and the second parameter B2 related to the N first regions F1 can be determined without moving the optical device 10 from the first position D1 to the second position D2.

3. Third Embodiment

Figure 7:
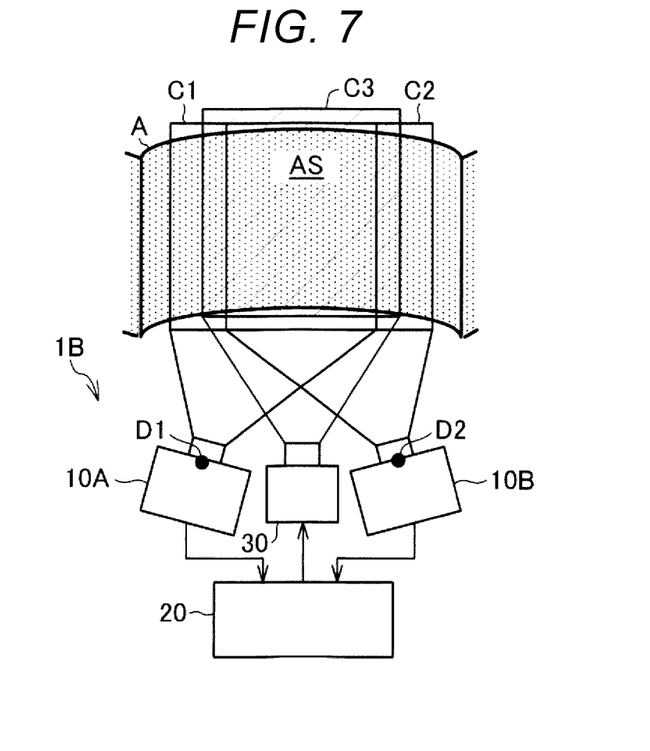
FIG. 7 is a schematic diagram showing an example of a parameter measurement system according to a third embodiment.

FIG. 7 is a schematic diagram showing an example of a parameter determination system 1B according to the embodiment. In FIG. 7, elements common to the first embodiment and the second embodiment are denoted by the same reference numerals, and a description thereof is omitted.

The parameter determination system 1B according to the embodiment further includes a projector 30 that projects a third image C3 onto the object A in the parameter determination system 1 according to the first embodiment or the parameter determination system 1A according to the second embodiment. FIG. 7 illustrates a case in which the parameter determination system 1A according to the second embodiment further includes the projector 30.

The third image C3 is an image in which a pattern serving as a mark for the corresponding points K is projected onto the surface AS of the object A. The first optical device 10A and the second optical device 10B acquire the first image C1 and the second image C2 by capturing the third images C3 projected onto the surface AS of the object A, respectively.

As a result, the pattern of the third image C3 is included in each of the first image C1 and the second image C2, and, based on the pattern, determination of the second range H2 corresponding to the first range H1, determination of the second region F2 corresponding to the first region F1, determination of the homography H which is a projective transformation matrix from the first region F1 to the second region F2, and the like can be accurately and easily performed.

The pattern of the third image C3 is, for example, a dot pattern, a checker flag pattern, or a periodic change pattern. The periodic change pattern is a pattern to be used when the corresponding point K is obtained by a phase shift method, and specifically, is a pattern in which light and darkness periodically change, for example, in a sine function in a direction connecting the first position D1 and the second position D2.

4. Fourth Embodiment

Figure 8:
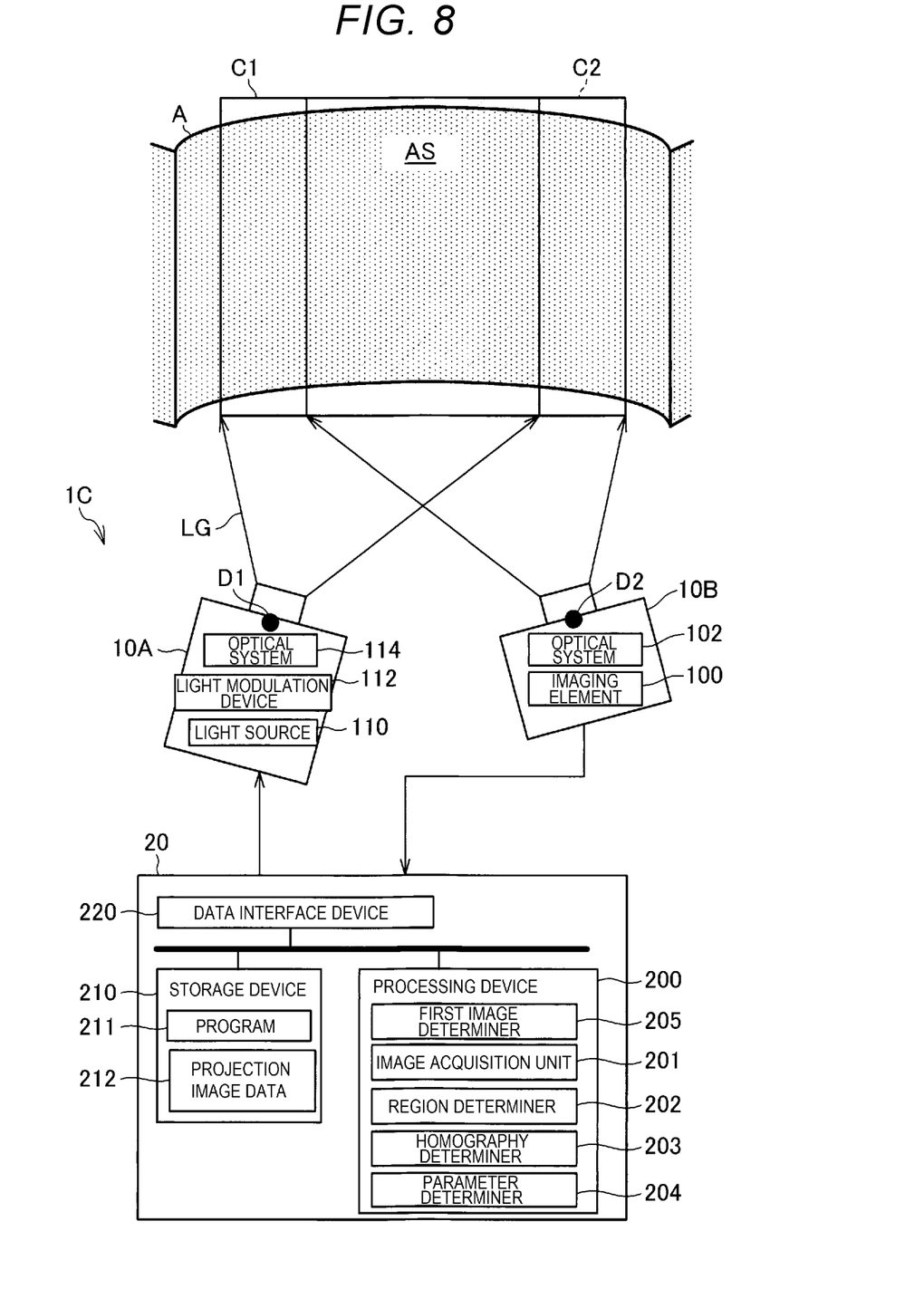
FIG. 8 is a schematic diagram showing an example of a parameter measurement system according to a fourth embodiment.

FIG. 8 is a schematic diagram showing an example of a parameter determination system 1C according to the embodiment. In FIG. 8, elements common to the first embodiment and the second embodiment are denoted by the same reference numerals, and a description thereof is omitted.

As shown in FIG. 8, the parameter determination system 1C according to the embodiment is different from the parameter determination system 1A according to the second embodiment in that the first optical device 10A is not an capturing device but a projector.

Specifically, the first optical device 10A according to the embodiment is a projector whose internal parameters are known and which projects the first image C1 onto the object A at the first position D1, and includes a light source 110, a light modulation device 112, and an optical system 114 for projection. The light source 110 is a discharge lamp, a semiconductor light source, or the like. Typical examples of the discharge lamp include a halogen lamp, a xenon lamp, and an ultra-high pressure mercury lamp. Typical examples of the semiconductor light source include a light-emitting diode (LED) and a laser diode. The light modulation device 112 includes a light modulation element that optically modulates light from the light source 110. The light modulation element is, for example, a liquid crystal panel or a digital micromirror device. The light modulation element may be a single liquid crystal panel or a digital mirror device, or may include a plurality of liquid crystal panels or digital mirror devices. The optical system 114 includes one or a plurality of optical elements that adjust a magnification ratio of the light output from the light modulation device 112 and an image position. The optical element is, for example, a lens and a mirror. Output light of the optical system 114 is emitted as image light LG of the first image C1 from the first optical device 10A and projected onto the surface AS of the object A.

In the embodiment, the object A is typically an object that can be used to project an image, and is, for example, a screen or a wall surface of a room or a building.

The first image C1 is, for example, an image including a pattern similar to that of the third image C3 according to the third embodiment. In the embodiment, projection image data 212 of the first image C1 is stored in advance in the storage device 210 of the information processing device 20. Further, by the information processing device 20 supplying the projection image data 212 to the first optical device 10A, the first optical device 10A projects the first image C1 onto the object A based on the projection image data 212. Then, the second optical device 10B captures the first image C1 that appears on the object A at the second position D2 to acquire the second image C2.

In the information processing device 20 in the embodiment, the processing device 200 further includes a first image determiner 205. The first image determiner 205 is a functional unit that determines the first image C1 that appears on the surface AS of the object A by projection of the first optical device 10A, and is implemented by the processing device 200 executing the program 211.

Specifically, the first image determiner 205 determines the first image C1 on the surface AS of the object A based on an optical center and a focal length of the optical system 114, which are the internal parameters of the first optical device 10A, and the projection image data 212. In this case, the coordinate system of the first image C1 is the coordinate system of the first optical device 10A, and is the world coordinate system Pw in the present disclosure. The first image determiner 205 may determine the first image C1 in which influence of a lens center is compensated based on the optical center and the focal length of the optical system 114.

Further, in the information processing device 20, the image acquisition unit 201 acquires the first image C1 from the first image determiner 205 and acquires the second image C2 from the second optical device 10B. Then, the information processing device 20 determines at least one of the one first parameter B1 and the N second parameters B2 by executing step Sa5 to step Sa9 in FIG. 5.

According to the embodiment, the first parameter B1 related to the second optical device 10B and the second parameter B2 related to the object A can be determined by setting the first coordinate system Pd1 of the projector, which is the first optical device 10A, as the world coordinate system Pw.

5. Modification

The embodiments described above may be modified in various ways. Aspects of a specific modification that can be applied to the embodiments described above will be described below. Two or more aspects freely selected from the following examples can be combined with each other as appropriate as long as technical contradiction does not occur.

For example, the information processing device 20 is not limited to one computer, and may be implemented by a plurality of computers. Specifically, functional units in the processing device 200 of the information processing device 20 may be implemented by processors included in the plurality of computers. In this case, the steps shown in FIG. 5 are assigned to the plurality of computers and executed by each computer.

For example, the information processing device 20 may be integrated with the optical device 10. In this case, the data interface device 220 may be omitted.

6. Application Example

The present disclosure can be widely used in various techniques including an element using the homography H between the first image C1 and the second image C2 obtained by capturing the object A which is an capturing target. Examples of such techniques include an image processing technique and a computer vision technique.

7. Summary of Present Disclosure

Hereinafter, appendices of the present disclosure will be added.

APPENDIX 1

A parameter determination method includes: determining N, N being a natural number greater than 1, first regions included in at least a part of a first image acquired by capturing an capturing target with a first optical device which is positioned at a first position and whose internal parameters are known, or the first image projected from the first optical device; determining N second regions corresponding to the respective N first regions in a one-to-one manner in a second image acquired by capturing the capturing target with a second optical device which is positioned at a second position different from the first position and whose internal parameters are known; determining N homographies by determining homographies between the N first regions and the N second regions in a one-to-one manner; and determining at least one of a first parameter related to the second optical device and a second parameter related to the capturing target by decomposing each of the N homographies.

According to appendix 1, even when the capturing target includes a non-planar surface, it is possible to determine the first parameter related to the second optical device. The second parameter related to the capturing target can also be determined.

APPENDIX 2

In the parameter determination method according to appendix 1, the determining at least one of the first parameter and the second parameter includes determining N first parameters by decomposing the respective N homographies, and determining one first parameters by statistically processing the N first parameters.

According to appendix 2, one first parameter B1 is accurately determined by statistically processing the N first parameters.

APPENDIX 3

In the parameter determination method according to appendix 1 or 2, the determining at least one of the first parameter and the second parameter includes determining the second parameters for the respective N first regions by decomposing the respective N homographies.

According to appendix 3, the second parameter related to the capturing target can be obtained for each of the N first regions.

APPENDIX 4

In the parameter determination method according to any one of appendices 1 to 3, at least a part of a surface of the capturing target includes a non-planar surface.

According to appendix 4, even when the non-planar surface is actually included in at least a part of the surface of the capturing target, the first parameter and the second parameter can be reliably determined based on the N homographies.

APPENDIX 5

In the parameter determination method according to any one of appendices 1 to 4, the first optical device is an capturing device including an optical system configured to acquire the first image by capturing the capturing target, or a projector including an optical system configured to project the first image, and the second optical device is an capturing device including an optical system configured to acquire the second image by capturing the capturing target.

According to appendix 5, the first parameter related to the capturing device corresponding to the second optical device can be determined by using the capturing device or the projector as the first optical device and using the capturing device as the second optical device.

APPENDIX 6

In the parameter determination method according to any one of appendices 1 to 5, the first optical device is a device configured to acquire the first image by capturing the capturing target, and the first image and the second image are images obtained by capturing a third image projected from a projector.

According to appendix 6, the second region F2 corresponding to the first region F1 and the like can be accurately and easily determined based on the third images that appear in the first image and the second image respectively.

APPENDIX 7

An information processing device includes: at least one processor configured to perform processing including: determining N, N being a natural number greater than 1, first regions included in at least a part of a first image acquired by capturing an capturing target with a first optical device which is positioned at a first position and whose internal parameters are known, or the first image projected from the first optical device, determining N second regions corresponding to the respective N first regions in a one-to-one manner in a second image acquired by capturing the capturing target with a second optical device which is positioned at a second position different from the first position and whose internal parameters are known, determining N homographies by determining homographies between the N first regions and the N second regions in a one-to-one manner, and determining at least one of a first parameter related to the second optical device and a second parameter related to the capturing target by decomposing each of the N homographies.

According to appendix 7, the same effect as that of appendix 1 is achieved.

APPENDIX 8

A non-transitory computer-readable storage medium store a program, the program causing a computer to execute processing including: determining N, N being a natural number greater than 1, first regions included in at least a part of a first image acquired by capturing an capturing target with a first optical device which is positioned at a first position and whose internal parameters are known, or the first image projected from the first optical device; determining N second regions corresponding to the respective N first regions in a one-to-one manner in a second image acquired by capturing the capturing target with a second optical device which is positioned at a second position different from the first position and whose internal parameters are known; determining N homographies by determining homographies between the N first regions and the N second regions in a one-to-one manner; and determining at least one of a first parameter related to the second optical device and a second parameter related to the capturing target by decomposing each of the N homographies.

According to appendix 8, the same effect as that of appendix 1 is achieved.

What is claimed is:

1. A parameter determination method comprising:
   determining N, N being a natural number greater than 1, first regions included in at least a part of a first image, the first image being
      acquired by capturing an capturing target with a first optical device which is positioned at a first position and has known internal parameters, or projected from the first optical device;
   determining N second regions corresponding to the respective N first regions in a one-to-one manner in a second image acquired by capturing the capturing target with a second optical device which is positioned at a second position different from the first position and has known internal parameters;
   determining N homographies by determining homographies between the N first regions and the N second regions in a one-to-one manner; and
   determining at least one of a first parameter related to the second optical device and a second parameter related to the capturing target by decomposing each of the N homographies.

2. The parameter determination method according to claim 1, wherein
   the determining at least one of the first parameter and the second parameter includes
      determining N first parameters by decomposing the respective N homographies, and
      determining one first parameter by statistically processing the N first parameters.

3. The parameter determination method according to claim 1, wherein
   the determining at least one of the first parameter and the second parameter includes determining the second parameters for the respective N first regions by decomposing the respective N homographies.

4. The parameter determination method according to claim 1, wherein
   at least a part of a surface of the capturing target includes a non-planar surface.

5. The parameter determination method according to claim 1, wherein
   the first optical device is an capturing device including an optical system for acquiring the first image by capturing the capturing target, or a projector including an optical system for projecting the first image, and the second optical device is an capturing device including an optical system for acquiring the second image by capturing the capturing target.

6. The parameter determination method according to claim 1, wherein
the first optical device is a device for acquiring the first image by capturing the capturing target, and
the first image and the second image are images obtained by capturing a third image projected from a projector.

7. An information processing device comprising:
at least one processor programmed to perform processing including
determining N, N being a natural number greater than 1, first regions included in at least a part of a first image, the first image being
acquired by capturing an capturing target with a first optical device which is positioned at a first position and has known internal parameters, or
projected from the first optical device,
determining N second regions corresponding to the respective N first regions in a one-to-one manner in a second image acquired by capturing the capturing target with a second optical device which is positioned at a second position different from the first position and has known internal parameters,
determining N homographies by determining homographies between the N first regions and the N second regions in a one-to-one manner, and
determining at least one of a first parameter related to the second optical device and a second parameter related to the capturing target by decomposing each of the N homographies.

8. A non-transitory computer-readable storage medium storing a program, the program causing a computer to execute processing including:
determining N, N being a natural number greater than 1, first regions included in at least a part of a first image, the first image being
acquired by capturing an capturing target with a first optical device which is positioned at a first position and has known internal parameters, or
the first image projected from the first optical device;
determining N second regions corresponding to the respective N first regions in a one-to-one manner in a second image acquired by capturing the capturing target with a second optical device which is positioned at a second position different from the first position and has known internal parameters;
determining N homographies by determining homographies between the N first regions and the N second regions in a one-to-one manner; and
determining at least one of a first parameter related to the second optical device and a second parameter related to the capturing target by decomposing each of the N homographies.

* * * * *